United States Patent [19]
Naboulsi et al.

[11] Patent Number: 5,805,591
[45] Date of Patent: Sep. 8, 1998

[54] SUBSCRIBER NETWORK INTERFACE

[75] Inventors: Marwan Naboulsi, Pleasanton; Ashok Kumar, Fremont; Mohamed Mostafa, Menlo Park; Gihad Ghaibeh, Redwood City; Amir Helweh; Rajesh Kumar, both of Fremont, all of Calif.

[73] Assignee: Ericsson Raynet, Menlo Park, Calif.

[21] Appl. No.: 608,436

[22] Filed: Feb. 28, 1996

[51] Int. Cl.$^6$ .................................................. H04H 1/08
[52] U.S. Cl. ........................... 370/395; 370/420; 370/486; 348/12
[58] Field of Search .................... 370/535, 420, 370/421, 537, 542, 395, 485–488, 399, 473, 474; 455/4.1–6.3; 348/6–14, 423; 359/137, 158; 375/222

[56] References Cited

U.S. PATENT DOCUMENTS

| | | |
|---|---|---|
| 4,367,548 | 1/1983 | Cotten, Jr. et al. . |
| 5,121,244 | 6/1992 | Takasaki .................................. 359/161 |
| 5,175,639 | 12/1992 | Takasaki .................................. 359/118 |
| 5,202,780 | 4/1993 | Fussganger ............................. 359/125 |
| 5,317,391 | 5/1994 | Banker et al. ............................... 348/6 |
| 5,325,223 | 6/1994 | Bears ....................................... 359/137 |
| 5,329,308 | 7/1994 | Binns et al. .............................. 348/14 |
| 5,363,432 | 11/1994 | Martin et al. .............................. 379/90 |
| 5,375,121 | 12/1994 | Nishino et al. . |
| 5,425,027 | 6/1995 | Baran ....................................... 370/395 |
| 5,479,286 | 12/1995 | Stalley et al. ............................ 359/125 |
| 5,499,047 | 3/1996 | Terry et al. .................................. 348/6 |
| 5,499,241 | 3/1996 | Thompson et al. ..................... 370/486 |
| 5,539,449 | 7/1996 | Blahut et al. ............................... 348/7 |
| 5,543,951 | 8/1996 | Moehrmann ............................ 370/395 |
| 5,561,466 | 10/1996 | Kiriyama ................................. 370/395 |

Primary Examiner—Chau Nguyen
Attorney, Agent, or Firm—Lyon & Lyon LLP

[57] ABSTRACT

A subscriber network interface for connecting a subscriber premise location to a broadband communication network transporting multiple two-way communication signals, including at least RF analog and RF carrier modulated ATM cells, respectively, includes a coupler for directing incoming communication signals onto, and outgoing signals off of, respectively, at least first and second internal RF communication paths, wherein the first RF communication path includes a bandwidth filter for restricting transmission to, e.g., a CATV broadcast signal, and the second RF communication path is connected to a first modem configured for demodulating and modulating, respectively, the incoming and outgoing ATM cells. A second modem for separately demodulating and modulating, respectively, incoming and outgoing digital baseband signals may also be provided.

19 Claims, 3 Drawing Sheets

SUBSCRIBER NETWORK INTERFACE

FIELD OF THE INVENTION

The present invention pertains to the field of communication networks, including methods and apparatus for connecting a subscriber premise location to a broadband communication network transporting multiple subscriber service signals over a single access cable.

BACKGROUND

It has become increasingly desirable to reduce the (overall) required transmission and distribution facilities for telecommunication and CATV broadcast distribution networks. In particular, it is desirable to be able to combine the delivery of, at least, two-way telecommunication signals and CATV broadcast signals over a single subscriber distribution cable, such as, e.g., an optical fiber or a coaxial cable, etc. For example, U.S. Pat. No. 5,363,432, issued Nov. 8, 1994 to Martin et al. and fully incorporated herein by reference, discloses a method and corresponding subscriber termination device for transmitting a broadband electrical signal carrying both CATV and telecommunication signals to a subscriber premise location over a traditional telecommunication cable comprising at least one pair of shielded electrical conductors. By way of another example, U.S. Pat. No. 4,367,548, issued to Cotten et al. and fully incorporated herein by reference, discloses a "subscriber station" for receiving CATV and FM radio broadcast signals, and for receiving and transmitting telephone and "data" signals, respectively, from and to a "telephone central office" over respective receiving and transmitting optical fiber cables.

In addition to the desirability of combining traditional telecommunication and CATV distribution networks, it is also desirable to be able to fully support the two-way transport of multiple "broadband" communication services, including services carried via RF analog or RF carrier modulated asynchronous transfer mode ("ATM") data cells, respectively, over an economic distribution network, such as, e.g., a single coaxial distribution cable. For example, it is presently anticipated that several new subscriber services will arise requiring both point-to-point and point-to-multipoint transmission of independent communication signals, including the ability to support a full range of both digital baseband and/or analog and digitally modulated RF carrier signals, respectively. In particular, ATM transmission, in which data packets, or "cells", containing information relating to one or more communication signals are periodically assembled and transmitted from a sending node and received and disassembled at a receiving node, enabling the transport of multiple services, wherein bandwidth utilization is optimized as a function of the statistical service activity. Further, with the explosion of recent interest in services associated with the "Internet", demand for low cost, high speed two-way digital data transport is at an all time high.

In order to support such a wide variety of communication signal protocols and service types transmitted over a single subscriber line, it is desirable to be able to provide a multi-functional subscriber "interface" at each respective subscriber premise location; i.e., to perform the requisite transmission, reception, provisioning (i.e., service parsing and routing), and maintenance, respectively, needed to achieve a service-independent, transparent gateway between the network and the respective subscribers.

SUMMARY OF THE INVENTION

The present invention provides a subscriber network interface and method for connecting a subscriber premise location to a broadband communication network transporting multiple communication signals, including at least RF analog and RF carrier modulated ATM cells, respectively, over a single network access line.

In accordance with one aspect of the invention, the subscriber interface includes an RF coupler for splitting incoming signals onto, and combining outgoing signals off of, respectively, first and second RF communication paths. Filter circuitry interposed along the first RF communication path preferably limits incoming signal transmission over that path, e.g., to within a CATV broadcast RF frequency spectrum. The filter circuitry also preferably also provides protection against unwanted upstream transmission of noise generated by subscriber terminal equipment. In some preferred embodiments, the filter circuitry may allow limited upstream signal transmission, e.g., in a frequency spectrum reserved for upstream RF signals, such as subscriber generated RF video signals. Amplification circuitry is also preferably interposed along the first RF communication path, preferably downstream from the filter circuitry, wherein the amplification circuitry automatically maintains incoming signal power at a constant level for use by the subscriber. In preferred embodiments, an RF service activation switch is also interposed along the first RF communication path for selectively allowing or denying, respectively, access by the subscriber to the incoming communication signal(s) in response to information, e.g., an instruction transmitted from a respective service provider, received in an incoming administrative signal.

In accordance with another aspect of the invention, the subscriber interface includes a first modem connected to the second RF communication path, wherein the first modem is configured for demodulating incoming ATM cells and modulating outgoing ATM cells, respectively. ATM cell-mux circuitry connected to the first modem provides for de-multiplexing and routing of incoming cells, and for collecting and multiplexing of outgoing cells, respectively, wherein the incoming and outgoing cells are routed to and from a plurality of "ATM" subscriber service modules within the subscriber interface. By way of non-limiting examples only, the respective service modules may provide services such as telecommunications, set-top telemetry, or baseband digital data (e.g., with various protocols, such as for LAN connections such as an EtherNet connection, or a PC modem), respectively. Each service module "disassembles" the respective incoming cells routed to it by the ATM cell-mux, converting (or "adapting") the data contained therein into an appropriate service protocol for delivery through a subscriber-side I/O port associated with the respective service module. The protocol conversion may include, for example, circuit emulation for providing a synchronous digital data stream, depending on the respective service. Conversely, information in upstream signals received through a subscriber-side I/O port is assembled into sequential cells by the respective service module and delivered to the ATM cell-mux. In this manner, the ATM transmission of combined services over the network side is advantageously transparent at the subscriber-side I/O ports of the subscriber interface. "Remote" service activation of any of the ATM-based subscriber services is preferably provided in response to information received from respective service providers in incoming administrative signals, e.g., by enabling or disabling, respectively, the exchange of data cells between the ATM cell-mux and a respective subscriber service module.

In accordance with yet another aspect of the invention, the RF coupler may be configured to split and combine the respective incoming and outgoing communication signals onto and off of, respectively, a third RF communication path, which is connected to a second modem. The second modem is preferably configured for separately demodulating and modulating incoming and outgoing (synchronous) digital baseband signals, respectively, which are transmitted over a separate RF frequency bandwidth than the ATM cells. Digital baseband mux circuitry connected to the second modem provides the respective de-multiplexing and routing of incoming digital data streams, and the collecting and multiplexing of outgoing digital data streams, respectively, to and from one or more "baseband" subscriber service modules within the interface device, which perform the requisite protocol conversion between the digital baseband mux and a respective subscriber-side I/O port. Again, remote service activation or deactivation of any of the "baseband-based" services is preferably provided in response to information received from a respective service provider in an incoming administrative signal.

Subscriber services supported by a preferred embodiment of the subscriber interface may include, for example, ATM transmission of digital information between information providers with a "point-of-presence" at a CATV head-end broadcast facility and "set-top" control circuitry located at respective subscriber premise locations, such as, e.g., an instruction sent "downstream" to activate or deactivate CATV service, or a "video-on-demand" request sent "upstream" from the respective set-top control circuitry to the broadcast facility. Another subscriber service supported by a preferred embodiment includes the two way delivery of digitally encoded video signals, e.g., "compressed video," for example, various Motion Picture Expert Group ("MPEG") encoding formats. Yet another identified group of services supported by a preferred embodiment includes both upstream and downstream transmission of "subscriber generated video," which may comprise, for example, compressed digital baseband or analog RF signals to be transmitted upstream from a subscriber location to a respective network juncture, for subsequent downstream delivery to the appropriate party (or parties), respectively.

The advantageous ability to support such services over a single subscriber connection line, such as that already carrying either telecommunication or CATV broadcast signals, or both, is a significant advancement in traditional communication networks. As will be apparent to those skilled in the art, other and further objects and advantages will appear hereinafter.

BRIEF DESCRIPTION OF THE DRAWINGS

The drawings illustrate both the design and utility of preferred embodiments of the present invention, in which.

DETAILED DESCRIPTION OF THE PREFERRED EMBODIMENTS

Figure 1:
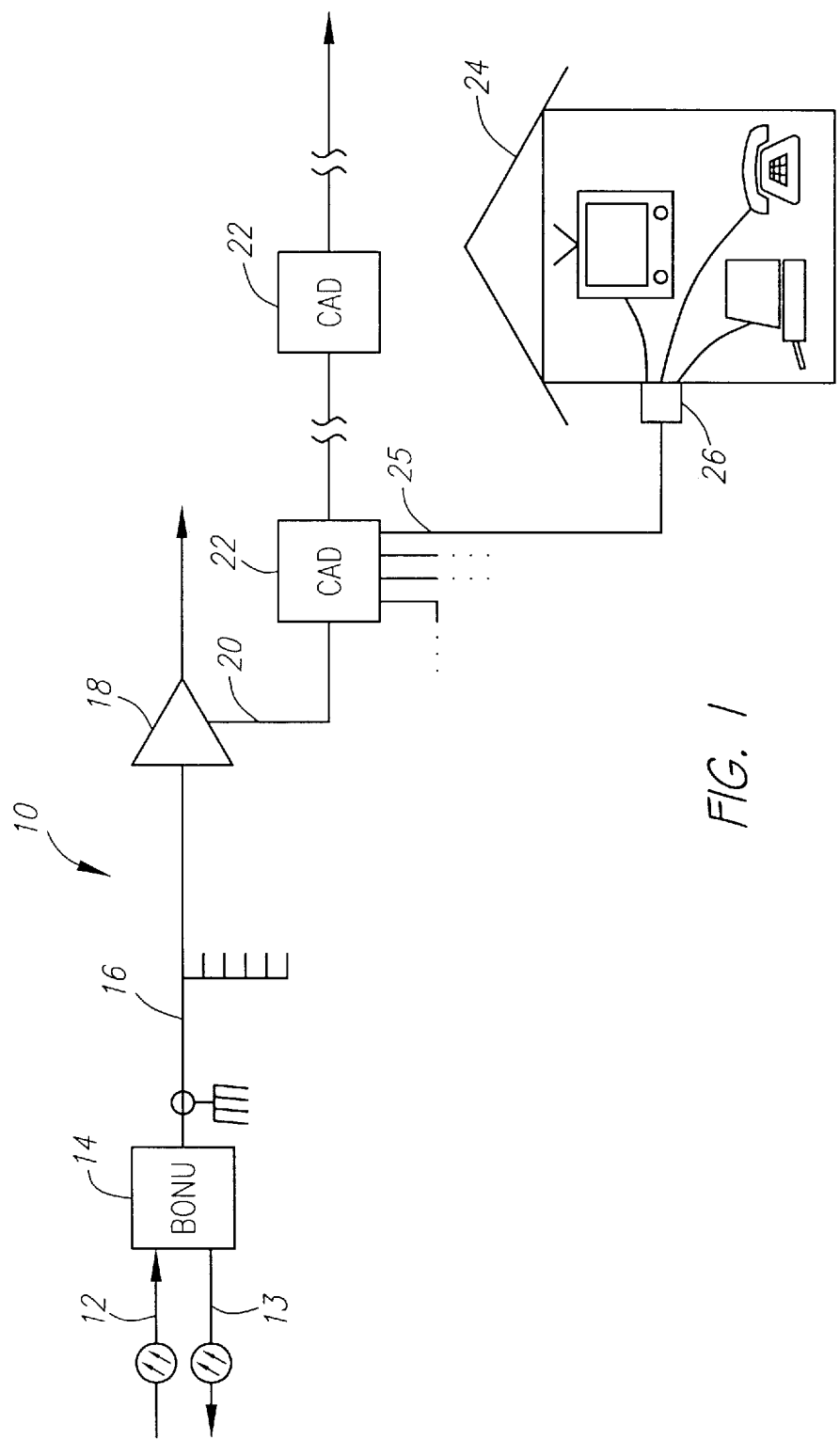
FIG. 1 is a block diagram of an exemplary broadband communication network transporting multiple communication signals between one or more service providers and a plurality of network subscribers.

Referring to FIG. 1, a broadband communication network 10 provides two-way optical transmission of respective "downstream" and "upstream" communication signals over optical fibers 12 and 13, respectively, to and from a broadband optical network unit ("BONU") 14. The downstream communication signal preferably includes at least an RF CATV broadcast signal, which is frequency division multiplexed ("FDMA") with a stream of RF carrier modulated ATM cells to form a "composite" downstream RF communication signal. The ATM cells preferably include digitally encoded information comprising one or more communication services, e.g., telecommunications or digital data, for subscribers of the respective network area served by the BONU 14, e.g., a residential neighborhood.

At the BONU 14, the downstream "composite" RF communication signal is converted from optical to RF electrical transmission and transmitted over a coaxial distribution cable 16 for delivery to a plurality of subscriber premise locations 24 served by the respective BONU 14. Interposed along the coaxial distribution cable 16 are periodic "bridger amplifiers" 18, which both amplify the downstream RF communication signal for further transmission over the (main) coaxial distribution cable 16, as well as split off a portion of the (amplified) RF signal for transmission onto one or more respective coaxial "feeder" cables 20. A series of coaxial access devices ("CADs") 22 interposed along each respective coaxial feeder cable 20 split the downstream composite RF signal off of the respective feeder coax cable 20 for distribution over one or more respective subscriber ("drop") cables 25. Each of the respective drop cables 25, in turn, is connected to a respective subscriber network interface 26 at a respective subscriber premise location 24. An implementation of a preferred coaxial access device (CAD) 22 is disclosed and described in U.S. patent application Ser. No. not-yet-assigned, Lyon & Lyon docket 213/093, entitled "Coaxial Access Device and Method", filed on the same date and assigned to the same assignees, respectively, as the present application, and which is fully incorporated herein by reference.

Although the above description has been, thus far, primarily directed to downstream signal transmission, upstream transmission of a respective composite upstream RF communication signal is also taking place, (i.e., simultaneously), from each respective subscriber interface 26, i.e., over the respective drop cables 25, feeder cables 20 and distribution cable 16, respectively, to a respective BONU location 14. It should further be noted that the particular communication services contained in the respective composite downstream and upstream signals may vary. By way of example only, a CATV broadcast signal is only part of a composite downstream signal, whereas a particular subscriber generated video signal is only part of a composite upstream signal, respectively, to and from an exemplary subscriber interface 26. In preferred embodiments separation of the respective downstream and upstream signals over the various sections of the coaxial network facilities (16, 20 and 25, respectively) is accomplished, for example, by a frequency domain separation techniques.

Figure 2:
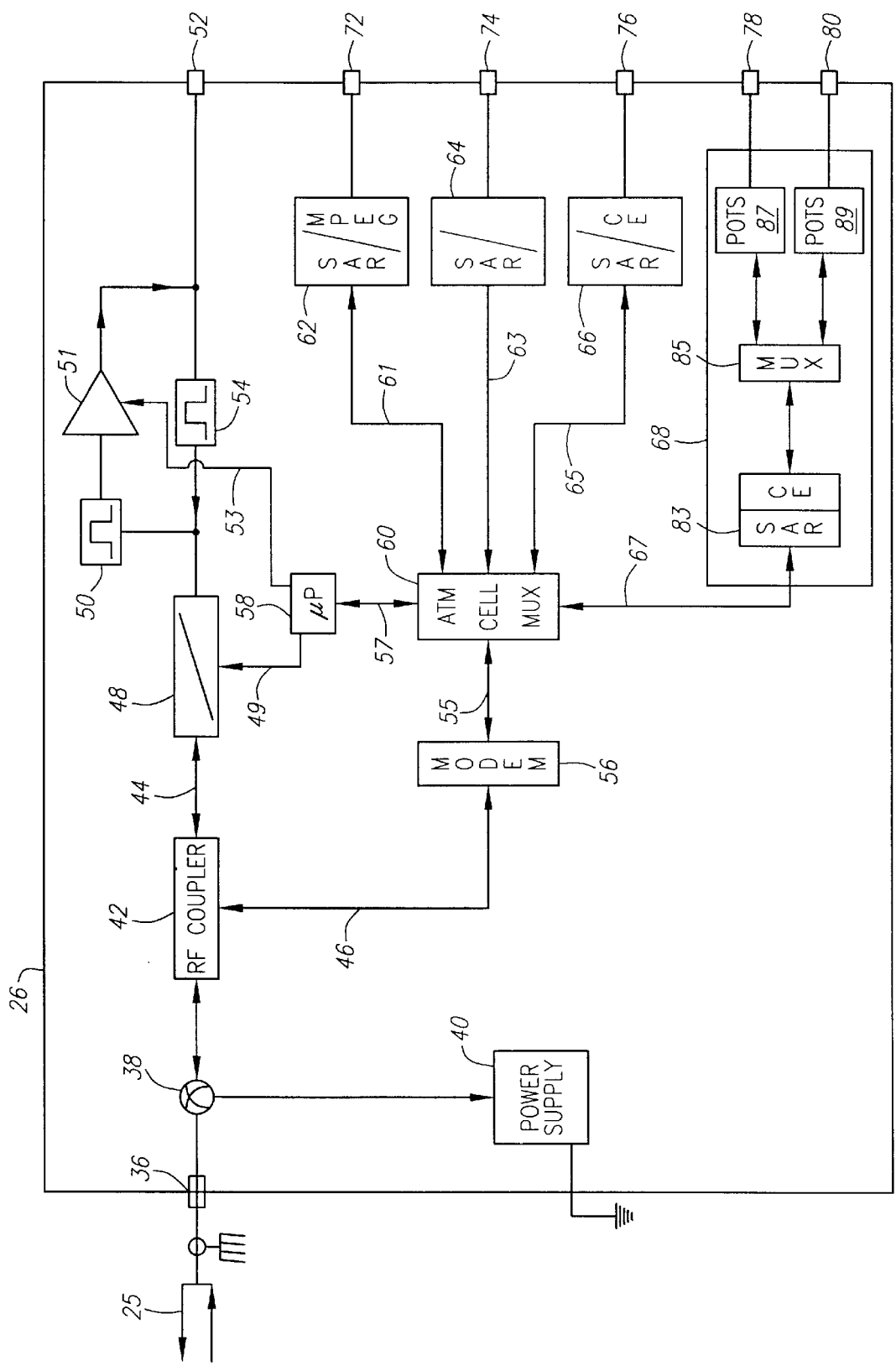
FIG. 2 is a functional block diagram of a first preferred embodiment of a subscriber network interface according to the present invention.

Referring to FIG. 2, a first preferred embodiment of the subscriber interface 26 includes a connection port 36 for electrically connecting to a respective coaxial drop cable 25. A relatively low frequency AC power signal is also supplied over the respective drop cable 25, i.e., combined with the relatively high frequency two-way RF communication signals, respectively. A diplexer circuit 38 separates the respective RF signals from the AC power signal, with the (isolated) AC power signal provided as an input signal for an internal power supply 40, which preferably converts the AC power signal into a DC operating voltage source for the subscriber interface 26.

The (isolated) incoming RF signal is passed through an RF coupler 42, which splits a first portion of the signal over a first RF communication path 44 and a second portion of the signal over a second RF communication path 46, respectively. Likewise, outgoing RF signals transmitted over RF communication paths 44 and 46, respectively, are combined by the coupler 42 into a composite upstream signal for transport, via connection port 36, over the drop cable 25.

A switch 48 is interposed along the first RF communication path 44, which will alternately allow or prevent, respectively, electrical transmission (in both directions) over that path; i.e., between the coupler 42 and an "RF" input/output port 52. In a preferred embodiment, the ON/OFF positioning of switch 48 is set by a service activation control signal 49 from a system microprocessor 58, e.g., in response to an instruction received in an incoming "administrative" signal from a respective RF service provider (described herein in greater detail). In an alternate preferred embodiment, the switch 48 may also be configured to be manually controlled, e.g., by a service technician with limited access to the subscriber interface 26.

In the downstream direction, (when switch 48 is "ON"), the portion of the downstream RF signal transmitted over the first RF communication path 44 is passed through a downstream RF bandpass filter 50 and an amplification circuit 51, respectively, and then connected to RF port 52. The downstream RF bandpass filter 50 preferably limits downstream throughput signal over the first RF communication path 44, for example, to a preselected CATV RF broadcast spectrum, in order to prevent information contained in other incoming signals from passing through RF port 52. The amplification circuit 51 is preferably automatically adjustable so that the (filtered) throughput RF signal power out RF port 52 is maintained at a substantial constant level, regardless of the input composite RF communication signal power through port 36. In a preferred embodiment, the amplification level is adjusted by an amplification control signal 53 from the system microprocessor 58, e.g., in response to an instruction from either the subscriber, or a service provider, respectively, received by the subscriber interface 26. Alternately, the amplification control signal 53 may be from a feedback circuit (not shown) across the RF port 52, whereby the amplification level is adjusted upward or downward in response to a respective decrease or increase, respectively, in the signal power level through RF port 52. In yet another alternate preferred embodiment, the amplification circuit 51 may also be manually controlled, e.g., by a service technician with limited access to the subscriber interface 26.

In the upstream direction, (when switch 48 is "ON"), the outgoing RF signals from RF port 52 are passed through an upstream RF bandpass filter 54, which is preferably inserted in parallel to the downstream bandpass filter 50 and amplification circuit 51, respectively, across the first communication path 44. Depending on the desired upstream service arrangement, the upstream RF bandpass filter 54 may preferably allow none, some or all of the upstream RF signal transmission received from port 52 to pass through to RF coupler 42. For example, if the broadband network 10 is not yet equipped to support upstream RF services, the bandpass filter 54 is preferably configured to eliminate all upstream signal transmission. In a more preferable broadband network 10, the upstream filter 54 will allow for limited upstream RF bandwidth transmission, i.e., to accommodate the upstream transmission of certain communication services such as, e.g., RF subscriber set-top telemetry signals, while still preventing upstream transmission of unwanted noise and/or EMI generated by subscriber terminal equipment connected to RF port 52.

The portion of the downstream RF signal transmitted over the second RF communication path 46 is input into an "ATM" modem 56 connected to path 46. In particular, the ATM modem 56 demodulates groups of digital data bits from the downstream composite RF modulated communication signal, which form a successive "stream" of incoming ATM cells. Simultaneously, in the upstream direction, the ATM modem 56 modulates digital data bits from a successive stream of outgoing ATM cells onto an RF carrier forming part of the upstream composite RF communication signal. In both directions, a simultaneous exchange of ATM cells takes place between the ATM modem 56 and an ATM cell-mux 60 over an interface link 55.

In the downstream direction, the ATM cell-mux 60 receives a constant stream of demodulated, multiplexed incoming ATM "cells" from link 55 and, by using known memory-based routing tables and/or address management software operated by the system microprocessor 58, in conjunction with information contained in the respective incoming cells, (e.g., in address headers or in other "routing-level" information fields), respectively, the ATM cell-mux de-multiplexes and routes the cells to a plurality of respective subscriber service modules 62, 64, 66 and 68, over duplex data buses 61, 63, 65 and 67, respectively. Similarly, in the upstream direction, the ATM cell-mux 60 receives individual outgoing cells from the respective subscriber service modules over buses 61, 63, 65 and 67, respectively, and multiplexes them together to form a successive stream of multiplexed outgoing ATM cells for transport over link 55 to the ATM modem 56.

In the illustrated preferred embodiment(s), subscriber service module 62 is configured to support digital (compressed) video transmission through an I/O port 72, e.g., from subscriber set-top equipment; subscriber service module 64 is configured to support an Ethernet ("10BaseT") connection through another I/O port 74, e.g., for a subscriber PC local area network ("LAN") connection; subscriber service module 66 is configured to support a synchronous (e.g., n×64 kbps) digital data line through yet another I/O port 76, e.g., for use as a dedicated Internet communications port; and subscriber service module 68 is configured as a telecommunications module, supporting first and second subscriber POTS ("plain old telephone service") telephone line (vf) ports 78 and 80, respectively.

Each of the respective subscriber service modules 62, 64, 66 and 68 "segments" the incoming ATM cells received over buses 61, 63, 65, and 67, respectively, wherein the digital information (i.e., bits) contained in each cell is disassembled from the incoming cell and reformatted into the respective protocol of the particular service supported by the respective module. Conversely, each respective service module "reassembles" outgoing digital information into successive ATM cells for transmission back over the respective data buses. Preferably, the cell "segmentation and reassembly" ("SAR") processing of respective incoming and outgoing ATM cells is performed by the respective subscriber service modules 62, 64, 66 and 68 in conformance with the recommendations of various standards organizations, including those specified by organizations such as ATM Forum, ITU-T, and Bellcore. It should be noted that the exact nature of the data stream transformation depends upon the respective subscriber service supported by the respective module, (i.e., as classified by the aforementioned recommendations).

For example, time sensitive services such as, e.g., the POTS telephone lines supported by the telecommunications module 68 through vf (analog) ports 78 and 80, and the n×64 kbps synchronous data line supported by service module 66 through I/O port 76, respectively, require the recovery of timing information from the incoming cells, known as "circuit emulation." A detailed description and explanation of ATM communications, including the respective SAR and service protocol adaptation (e.g., circuit emulation) processes, as well as the requisite industry standards relating to communication services transported via ATM, respectively, is provided in the text, "ATM Theory and Application" by McDysan and Spohn, (1995 McGraw-Hill), which is incorporated herein by reference.

In the telecommunications module 68, the SAR functions are performed by an ATM interface circuit 83, which receives and transmits the respective incoming and outgoing ATM cells over bus 67. In the downstream direction, the ATM interface circuit 83 disassembles the respective incoming cells and, by known circuit emulation techniques, reformats the digital information contained therein into a synchronous data stream, which is transmitted to a (digital data) mux 85. The mux 85 separates the incoming data stream into first and second synchronous channels, which are connected to POTS line cards 87 and 89, respectively. As is well known in the art, the respective POTS line cards 87 and 89 each perform a digital to analog conversion of the respective incoming signals for transmission out respective vf (analog) ports 78 and 80. Conversely, outgoing telephone signals received through ports 78 and 80 are converted to synchronous digital signals by the respective line cards 87 and 89, combined by the mux 85 and transmitted to the ATM interface circuit 83, respectively. The ATM interface circuit 83 assembles the outgoing data stream into successive cells, which are transmitted over bus 67 to the ATM cell-mux 60.

The ATM cell-mux 60 is linked to the system microprocessor 58 by a high speed duplex data bus 57. Through bus 57, the system microprocessor 58 assists the ATM cell-mux 60 with the downstream cell de-multiplexing and routing, and the upstream cell collection and multiplexing, respectively. The bus 57 also allows for transmission of system-level operations, administration, maintenance and provisioning ("OAM&P") information transmitted in incoming ATM data cells to the microprocessor 58; e.g., within "system level" data fields contained in respective subscriber service cells, or within dedicated "administrative" data cells, respectively.

By way of example, incoming OAM&P information may include service activation (or termination) instructions from a respective subscriber service provider, e.g., a CATV broadcast provider—wherein the ON/OFF positioning of "RF" switch 48 is set by the microprocessor 58 via signal 49 in response to the instructions. Other service activation instructions may relate to any of the ATM cell-based subscriber service modules,—wherein the microprocessor 58 will "enable" or "disable", as called for in a respective incoming instruction, the exchange of incoming and outgoing ATM cells between the cell-mux 60 and a respective subscriber service module 62, 64, 66 or 68.

Preferably, internal control and alarm buses (not shown) provide the system microprocessor with the ability to monitor the performance and operating status of individual components within the subscriber interface 26. It should also be noted that OAM&P information may be sent upstream by the microprocessor 58, e.g., to a respective service provider or network management module (not shown) of the broadband network 10, respectively, for routine supervision and status, as well as for real-time maintenance purposes. In some preferred embodiments, usage information, i.e., of the usage of particular subscriber services, may also be sent upstream, e.g., for billing purposes.

Thus, with the aforedescribed advantageous subscriber interface 26 configuration, the ATM transmission of combined services over the network 10 "side" of the subscriber interface 26 (i.e., drop line 25) is advantageously transparent at the subscriber-side of the subscriber interface 26 (i.e., ports 52, 72, 74, 76, 78 and 80, respectively).

Figure 3:
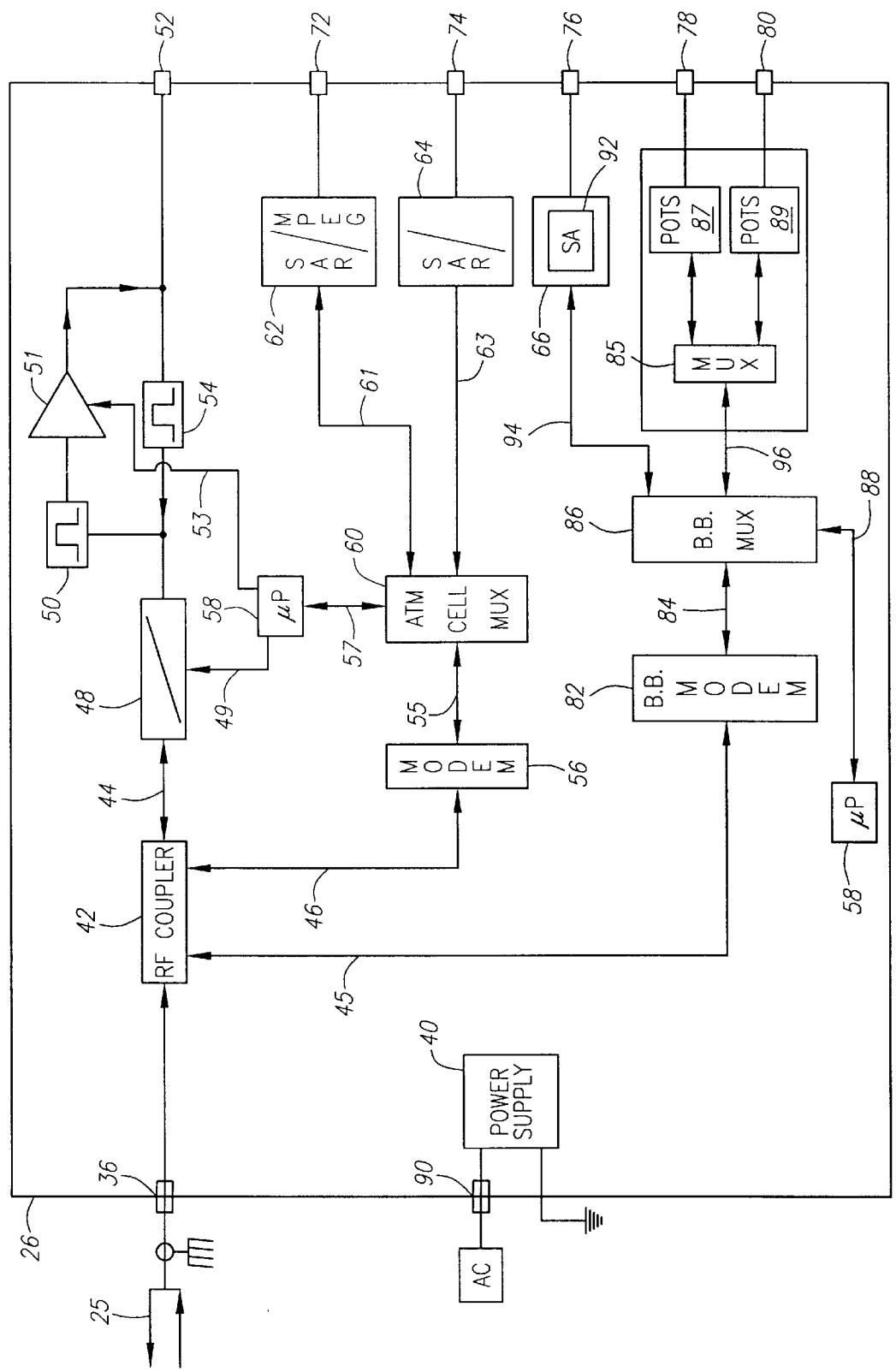
FIG. 3 is a functional block diagram of a second preferred embodiment of a subscriber network interface according to the present invention.

Referring to FIG. 3, in an alternate preferred embodiment of the subscriber interface 26, the RF coupler 42 splits a portion of the incoming composite RF communication signal onto a third RF communication path 45, i.e., in addition to the portion of the signal transmitted onto first and second RF communication paths 44 and 46, respectively. Likewise, outgoing RF signals transmitted upstream over RF communication path 45 is combined by the coupler 42 with the upstream transmission(s) over paths 44 and 46, respectively, into the composite upstream RF communication signal for transport, via connection port 36, over the drop cable 25. Accordingly, sufficient RF frequency bandwidth must be reserved to accommodate both the respective downstream and upstream modulated baseband signals, in addition to the respective downstream and upstream modulated ATM signals and (if applicable) downstream and upstream RF signals, respectively, through coupler 42.

In particular, the portion of the downstream RF signal transmitted over the third RF communication path 45 is input into a "baseband" modem 82 connected to path 45, which extracts an incoming synchronous digital baseband data stream from the downstream composite RF modulated communication signal. Simultaneously, in the upstream direction, the baseband modem 82 modulates an outgoing synchronous digital data stream onto an RF carrier for upstream transmission back over RF path 45 to the coupler 42. The respective incoming and outgoing synchronous data streams are transmitted and received by the baseband modem, respectively, to and from a baseband-mux 86 over an interface link 84. The baseband-mux 86 separates the (demodulated) incoming digital data stream received over link 84 into one or more individual incoming digital data streams for transport to one or more respective "baseband" subscriber service modules. Conversely, in the upstream direction, the baseband-mux 86 receives one or more individual outgoing digital data streams from the respective baseband subscriber service modules and combines them to form the outgoing synchronous data stream for transport over link 84 to the baseband modem 82, respectively.

By way of example, in the alternate preferred embodiment illustrated in FIG. 3, the telecommunications module 68 and the synchronous n×64 kbps data line module 66, respectively, are configured as "baseband" subscriber service modules, i.e., configured for receiving and transmitting incoming and outgoing digital baseband signals, respectively, instead of ATM cells. In particular, the baseband-mux 86 transmits and receives respective incoming and outgoing digital data streams to and from the synchronous data module 66 over a synchronous data bus 94, and to and from the telecommunications module 68 over a synchronous data bus 96, respectively.

Because the respective digital signals transmitted to and from the baseband-mux 86 are in a synchronized baseband format, no SAR or circuit emulation functionality is required on the part of the respective service modules 66 and 68. Instead, only a data format change may be required within the respective module, e.g., the addition or deletion of system level information or overhead bits, wherein a data buffer my be preferably employed to assist in reformatting the respective incoming and outgoing data streams. In the telecommunications module 68, this "service adaptation"

functionality is preferably performed by the mux 85. In the synchronous data module 66, a respective service adaptation circuit 92 is provided.

The baseband-mux 86 is linked to the system microprocessor 58 by a high speed duplex data bus 88. Through bus 88, the system microprocessor 58 assists the baseband-mux 86 with the downstream de-multiplexing and routing, and the upstream multiplexing, respectively, of the respective digital baseband signals. The bus 88 also allows for transmission of OAM&P information transmitted in incoming baseband signals to the microprocessor 58; e.g., within "system level" data channels (e.g., bytes) contained in respective incoming data frames. As with the ATM cell-mux 60, incoming OAM&P information related to the baseband-mux 86 may include service activation (or termination) instructions from a respective baseband subscriber service provider, e.g., a telephone company,—wherein the microprocessor 58 will "enable" or "disable", as called for in a respective incoming instruction, the exchange of incoming and outgoing digital data stream between the baseband-mux 86 and a respective subscriber service module 66 or 68.

Another aspect of the alternate preferred embodiment in FIG. 3 is that the AC input power for the power supply 40 is provided from a separate power input port 90, instead of being combined with the RF communication signals on the subscriber drop cable 25. With this configuration, no diplexer circuit is required to isolate the relatively low frequency AC power signal and relatively high frequency downstream and upstream RF communication signals, respectively.

Thus, preferred embodiments have been disclosed of a subscriber network interface for connecting a subscriber premise location with a broadband network providing multiple, two-way communication services over a single communication cable to a subscriber premise location. While embodiments and applications of this invention have been shown and described, as would be apparent to those skilled in the art, many more modifications and applications are possible without departing from the inventive concepts herein.

By way of example only, instead of, or in addition to, POTS telephone line cards 87 and 89, respectively, one or more ISDN (integrated services digital network) digital line cards may be deployed in the telecommunications module 68, depending on the particular services supported over the broadband network 10, wherein each ISDN line card would require a corresponding digital I/O port in the subscriber interface 26.

The scope of the inventions, therefore, are not to be restricted except in the spirit of the appended claims.

What is claimed:

1. A subscriber network interface for receiving and transmitting multiple subscriber service signals, comprising:
    a plurality of independently controlled subscriber service modules, each subscriber service module comprising ATM cell segmentation and reassembly ("SAR") circuitry configured for disassembling incoming ATM cells into a respective incoming subscriber service signal and for assembling outgoing ATM cells from a respective outgoing subscriber service signal, at least one subscriber service module comprising circuit emulation circuitry for supporting telecommunication services;
    a first modem configured for demodulating an incoming RF signal carrying incoming ATM cell traffic and for RF modulating outgoing ATM cell traffic; and
    an ATM cell-mux connected to said first modem, said ATM cell-mux including
        a de-multiplexor circuit configured for receiving a continuous stream of incoming ATM cells communicated from said first modem, and for distributing said incoming ATM cells to one or more of said subscriber service modules, and
        a multiplexor circuit configured for receiving individual outgoing ATM cells communicated from one or more of said subscriber service modules, and for transmitting a continuous stream of outgoing ATM cells to said first modem.

2. The interface of claim 1, further comprising a second modem and a digital baseband-mux, said digital baseband-mux including
    a de-multiplexor circuit configured for receiving a single incoming digital baseband data stream communicated from said second modem, and for transmitting one or more incoming digital baseband data streams derived therefrom to respective subscriber service modules, and
    a multiplexor circuit configured for receiving one or more outgoing digital baseband data streams communicated from respective subscriber service modules, and for transmitting a single outgoing digital baseband data stream to said second modem.

3. The interface of claim 1, further comprising means for selectively activating or deactivating, respectively, one or more subscriber service signals in response to information contained in an incoming administrative signal.

4. A subscriber network interface for receiving and transmitting multiple subscriber service signals off of and onto, respectively, a network communication line, the interface comprising:
    a plurality of independently controlled subscriber service modules, each subscriber service module comprising ATM cell segmentation and reassembly ("SAR") circuitry configured for disassembling incoming ATM cells into a respective incoming subscriber service signal and for assembling outgoing ATM cells from a respective outgoing subscriber service signal, at least one subscriber service module comprising a telecommunications module having circuit emulation circuitry for supporting telecommunication services;
    first and second RF communication paths;
    a coupler having means for splitting incoming RF signals onto at least said first and second RF communication paths, and for combining outgoing RF signals received from said first and second RF communication paths;
    a first modem connected to said second RF communication path, said first modem configured for demodulating an incoming RF signal carrying incoming ATM cell traffic and for RF modulating outgoing ATM cell traffic; and
    an ATM cell-mux connected to said first modem, said ATM cell-mux including
        a de-multiplexor circuit configured for receiving a continuous stream of incoming ATM cells communicated from said first modem, and for distributing said incoming ATM cells to one or more of said subscriber service modules, and
        a multiplexor circuit configured for receiving individual outgoing ATM cells communicated from one or more of said subscriber service modules, and for transmitting a continuous stream of outgoing ATM cells to said first modem.

5. The interface of claim 4, further comprising filter circuitry interposed along said first RF communication path, said filter circuitry limiting incoming RF signal transmission to within a first bandwidth and limiting outgoing RF signal transmission to within a second bandwidth, respectively.

6. The interface of claim 4, further comprising amplification circuitry interposed along said first RF communication path.

7. The interface of claim 6, said amplification circuitry including means for automatically adjusting the power level of an incoming RF signal transmitted over said first RF communication path, whereby said power level is maintained substantially constant.

8. The interface of claim 6, said amplification circuitry being manually adjustable.

9. The interface of claim 4, further comprising means for selectively allowing RF signal transmission over said first RF communication path in response to information contained in an incoming administrative signal.

10. The interface of claim 4, wherein said telecommunications module further comprises a plurality of line cards, said line cards each connected to a respective subscriber wire pair.

11. The interface of claim 10, wherein said telecommunications module further comprises means for activating any one of said plurality of line cards in response to information contained in an incoming administrative signal.

12. The interface of claim 4, further comprising a second modem and a digital baseband-mux, said digital baseband-mux including
    a de-multiplexor circuit configured for receiving a single incoming digital baseband data stream communicated from said second modem, and for transmitting one or more incoming digital baseband data streams derived therefrom to respective subscriber service modules, and
    a multiplexor circuit configured for receiving one or more outgoing digital baseband data streams communicated from respective subscriber service modules, and for transmitting a single outgoing digital baseband data stream to said second modem.

13. The interface of claim 4, further comprising means for selectively activating or deactivating, respectively, one or more ATM-based subscriber services in response to information contained in an incoming administrative signal.

14. In a broadband communication network, an interface for receiving and transmitting multiple subscriber service signals off of and onto, respectively, a network access line, comprising:
    a plurality of independently controlled subscriber service modules, each subscriber service module comprising ATM cell segmentation and reassembly ("SAR") circuitry configured for disassembling incoming ATM cells into a respective incoming subscriber service signal and for assembling outgoing ATM cells from a respective outgoing subscriber service signal, at least one subscriber service module comprising a telecommunications module having circuit emulation circuitry for supporting telecommunication services;
    first, second and third RF communication paths;
    an coupler having means for splitting incoming RF signals onto said first, second and third RF communication paths, and for combining outgoing RF signals received from said first, second and third RF communication paths;
    a first modem connected to said second RF communication path, said first modem configured for demodulating an incoming RF signal carrying incoming ATM cell traffic and for RF modulating outgoing ATM cell traffic;
    an ATM cell-mux connected to said first modem, said ATM cell-mux including
        a de-multiplexor circuit configured for receiving a continuous stream of incoming ATM cells communicated from said first modem, and for distributing said incoming ATM cells to one or more of said subscriber service modules, and
        a multiplexor circuit configured for receiving individual outgoing ATM cells communicated from one or more of said subscriber service modules, and for transmitting a continuous stream of outgoing ATM cells to said first modem;
    a second modem connected to said third RF communication path; and
    a digital baseband-mux connected to said second modem, said digital baseband-mux including
        a de-multiplexor circuit configured for receiving a single incoming digital baseband data stream communicated from said second modem, and for transmitting one or more incoming digital baseband data streams derived therefrom to respective subscriber service modules, and
        a multiplexor circuit configured for receiving one or more outgoing digital baseband data streams communicated from respective subscriber service modules, and for transmitting a single outgoing digital baseband data stream to said second modem.

15. The interface of claim 14, further comprising means for selectively allowing RF signal transmission over said first RF communication path in response to information contained in an incoming administrative signal.

16. The interface of claim 14, said telecommunications module including
    one or more line cards, said one or more line cards each connected to a respective subscriber wire pair, and
    means for activating any one of said one or more line cards in response to information contained in an incoming communication signal.

17. The interface of claim 14, further comprising filter circuitry interposed along said first RF communication path, said filter circuitry limiting incoming RF signal transmission to within a first bandwidth and limiting outgoing RF signal transmission to within a second bandwidth, respectively.

18. The interface of claim 14, further comprising means for selectively activating or deactivating, respectively, one or more ATM-based subscriber services in response to information contained in an incoming administrative signal.

19. The interface of claim 14, further comprising means for selectively activating or deactivating, respectively, one or more subscriber service modules in response to information contained in an incoming administrative signal.

* * * * *